US005154464A

United States Patent [19]

Eichman

[11] Patent Number: 5,154,464

[45] Date of Patent: Oct. 13, 1992

[54] LOG HANDLING APPARATUS

[76] Inventor: Alvin T. Eichman, Rte. 1, Box 259, Dekalb, Tex. 75559

[21] Appl. No.: 760,379

[22] Filed: Sep. 16, 1991

[51] Int. Cl.[5] ..................... A47J 49/00

[52] U.S. Cl. ..................... 294/9; 294/131; 248/127

[58] Field of Search ..................... 294/9, 10, 11, 15, 16, 294/17, 131, 55.5; 248/127

[56] References Cited

U.S. PATENT DOCUMENTS

| | | | |
|---|---|---|---|
| 2,200,690 | 5/1940 | Elliott | 248/127 X |
| 2,350,207 | 5/1944 | Wyscaver | 294/131 X |
| 3,858,320 | 1/1975 | Neal et al. | 294/131 X |
| 4,248,464 | 2/1981 | Cross | 294/9 |
| 4,299,525 | 11/1981 | Coffman | 294/9 X |
| 4,355,831 | 10/1982 | Smith | 294/11 |
| 4,423,898 | 1/1984 | Spor | 294/9 |
| 4,453,876 | 6/1984 | Arpin | 414/207 X |
| 4,522,437 | 6/1985 | Gleman | 294/9 |
| 4,542,927 | 9/1985 | Missman | 294/9 |

*Primary Examiner*—Margaret A. Focarino
*Assistant Examiner*—Dean J. Kramer
*Attorney, Agent, or Firm*—Leon Gilden

[57] ABSTRACT

An apparatus wherein a carrier member is arranged for positioning a fireplace log thereon for projecting and positioning the fireplace log within an associated fireplace hearth. The carrier member is arranged for positioning upon a support member to space the carrier member relative to combustible material. A modification of the invention includes the carrier member arranged to pivotally mount support legs thereon to accommodate logs of various sizes.

6 Claims, 4 Drawing Sheets

LOG HANDLING APPARATUS

BACKGROUND OF THE INVENTION

1. Field of the Invention

The field of invention relates to fireplace apparatus, and more particularly pertains to a new and improved log handling apparatus wherein the same is arranged for the safe and convenient manipulation of logs relative to a fireplace hearth.

2. Description of the Prior Art

Typically, a woodburning fireplace is best employed when an individual is capable of properly positioning fireplace logs therewithin to provide for an efficient use of such logs. In the past, the fireplace logs are positioned within the fireplace in a random manner and then attempted to be positioned utilizing various rods and the like. While log manipulation apparatus is utilized in the prior art, the prior art has heretofore failed to provide an organization of a type to safely and properly orient logs within a fireplace hearth and thereafter permit mounting of the associated manipulation member, such as a carrier member utilized by the instant invention upon a safety support stand.

Prior art structure is exemplified in U.S. Pat. No. 4,637,769 to Thorndike wherein a log carrier utilizes a hook pivotally mounted to underlying legs to grasp a log therebetween.

U.S. Pat. No. 4,474,396 to Dennie sets forth a fireplace log handle wherein a forward hook is cooperatively mounted relative to a rear projection member to grasp a log therebetween.

U.S. Pat. No. 4,626,015 to Kruyt sets forth a fireplace carrier wherein a platform utilizes a plurality of handles mounted to the platform.

As such, it may be appreciated that there continues to be a need for a new and improved log handling apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fireplace apparatus now present in the prior art, the present invention provides a log handling apparatus wherein the same is arranged to permit mounting of a log thereon in manipulation of the log relative to an associated fireplace. As such, the general purpose of the present invention, which will be described subsequently in greater detail, is to provide a new and improved log handling apparatus which has all the advantages of the prior art fireplace apparatus and none of the disadvantages.

To attain this, the present invention provides an apparatus wherein a carrier member is arranged for positioning a fireplace log thereon for projecting and positioning the fireplace log within an associated fireplace hearth. The carrier member is arranged for positioning upon a support member to space the carrier member relative to combustible material. A modification of the invention includes the carrier member arranged to pivotally mount support legs thereon to accommodate logs of various sizes.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraselogy, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved log handling apparatus which has all the advantages of the prior art fireplace apparatus and none of the disadvantages.

It is another object of the present invention to provide a new and improved log handling apparatus which may be easily and efficiently manufactured and marketed.

It is a further object of the present invention to provide a new and improved log handling apparatus which is of a durable and reliable construction.

An even further object of the present invention is to provide a new and improved log handling apparatus which is susceptible of a low cost of manufacture with regard to both materials and labor, and which accordingly is then susceptible of low prices of sale to the consuming public, thereby making such log handling apparatus economically available to the buying public.

Still yet another object of the present invention is to provide a new and improved log handling appratus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
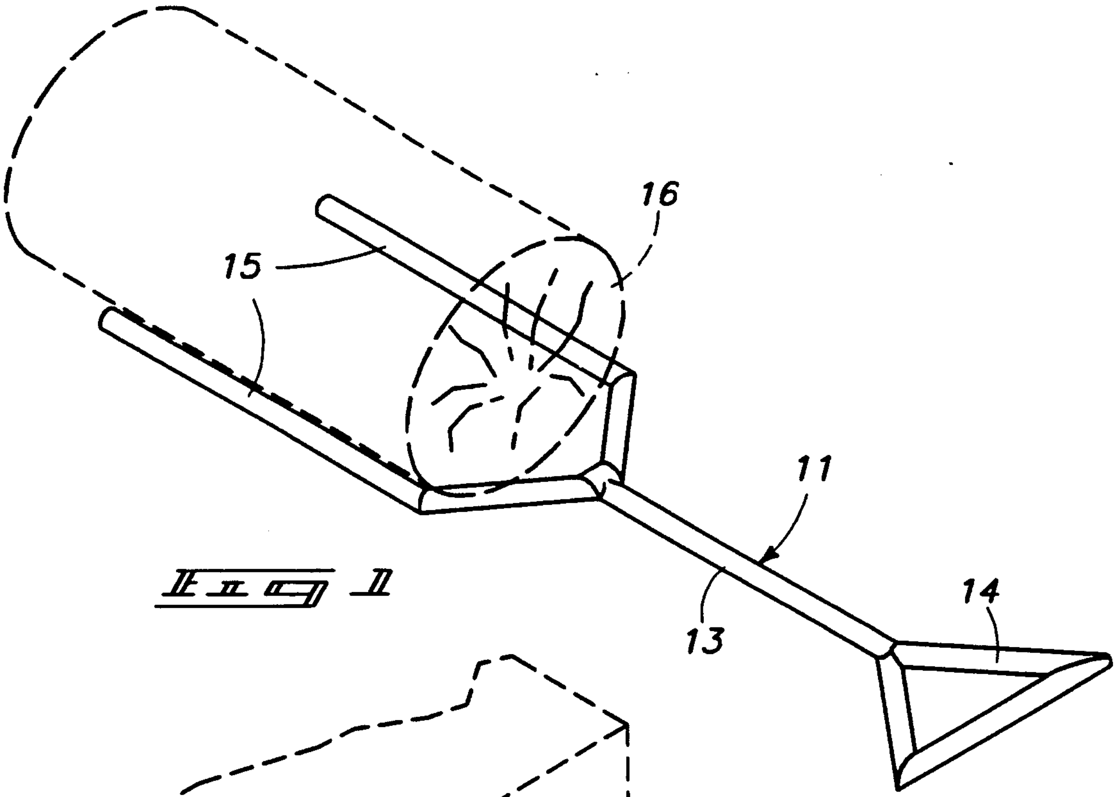
FIG. 1 is an isometric illustration of a carrier member utilized in the invention.

With reference now to the drawings, and in particular to FIGS. 1 to 9 thereof, a new and improved log handling apparatus embodying the principles and concepts of the present invention and generally designated by the reference numeral 10 will be described.

Figure 2:
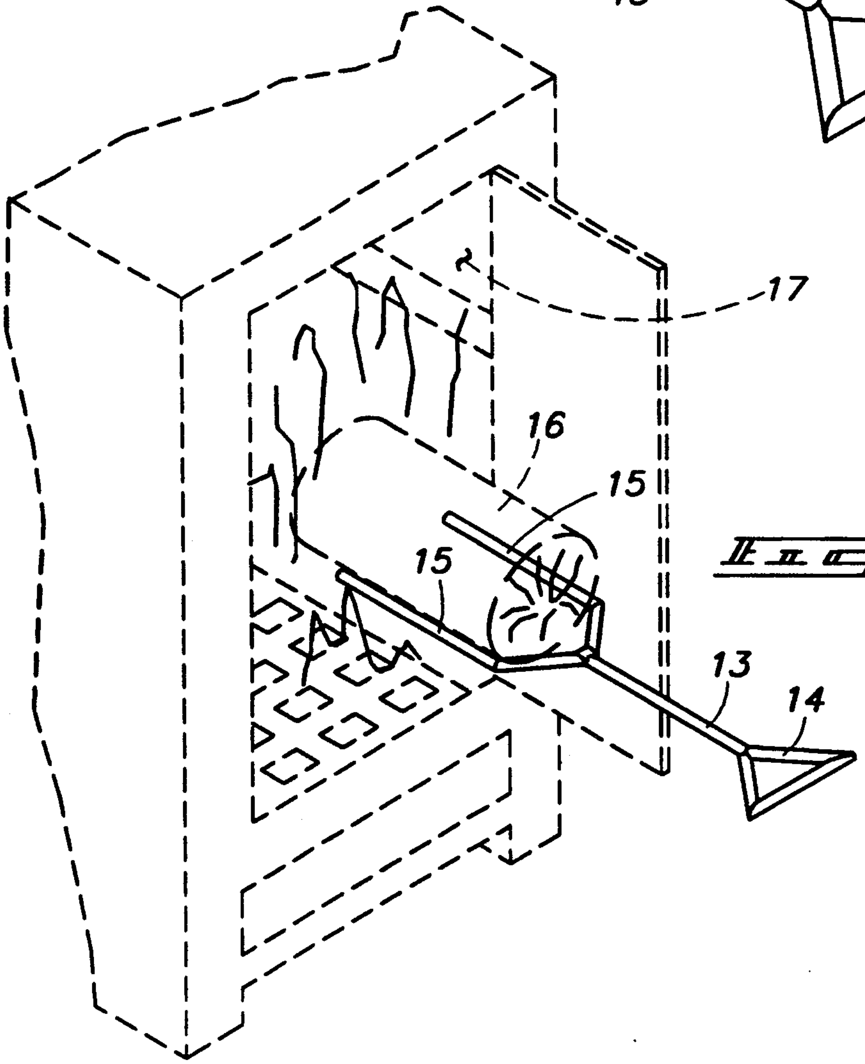
FIG. 2 is an isometric illustration of the carrier member arranged for manipulation of a log relative to an associated fireplace hearth.
Figure 3:
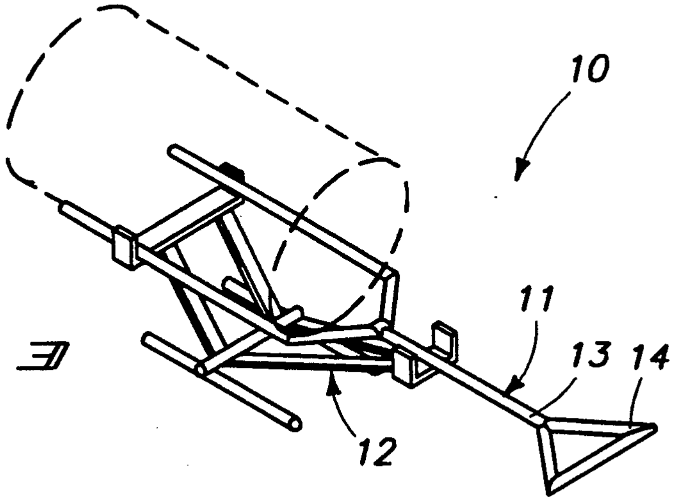
FIG. 3 is an isometric illustration of the invention in an assembled configuration.
Figure 4:
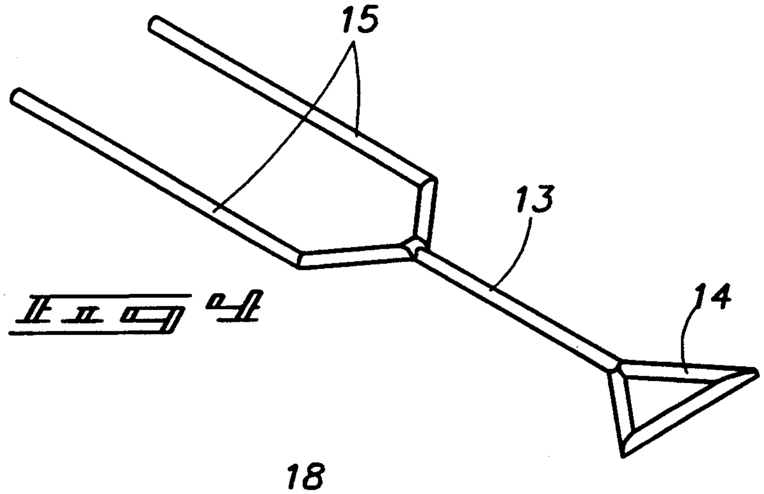
FIG. 4 is an isometric illustration of the carrier member.
Figure 5:
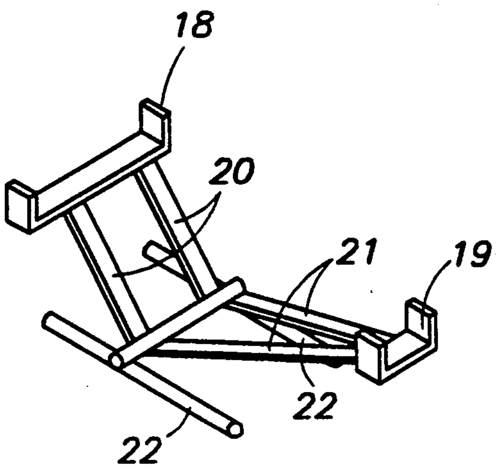
FIG. 5 is an isometric illustration of the support member.

More specifically, the log handling apparatus 10 of the instant invention essentially comprises a carrier member 11, such as illustrated in FIG. 1, to include a central support bar 13 defined by a predetermined thickness, with a carrier member handle fixedly mounted to a rear distal end of the support bar 13, with a plurality of support legs defined by a right and left parallel support leg 15 fixedly mounted at a forward distal end of the support bar that are arranged in a coextensive relationship relative to one another to define a "U" shaped cradle to position a fire log 16 thereon permitting positioning and manipulation of the fire log 16 within a hearth 17, such as illustrated in FIG. 2. Prior to and subsequent the use of the carrier member 11, it is desirable to position the carrier member 11 upon an appropriate support to properly align the carrier member and prevent its physical contact with environmental combustible materials. The carrier member 11 is arranged for utilization in combination with a support member 12 that is formed with respective forward and rear parallel "U" shaped brackets 18 and 19. The forward "U" shaped bracket 18 is defined by a first length equal to the predetermined width, wherein the rear "U" shaped support bracket is defined by a second length less than the first length and equal to the predetermined thickness to permit reception of the support legs 15 upon the forward "U" shaped bracket, with the support bar 13 received within the rear "U" shaped bracket. Forward support legs 20 mount the forward "U" shaped bracket 18, while rear support legs 21 mount the rear "U" shaped bracket 19. Mounting bars 22 fixedly mounted to lower terminal ends of the forward and rear support legs 20 and 21 provide for stable mounting of the support member 12 upon an underlying surface.

Figure 6:
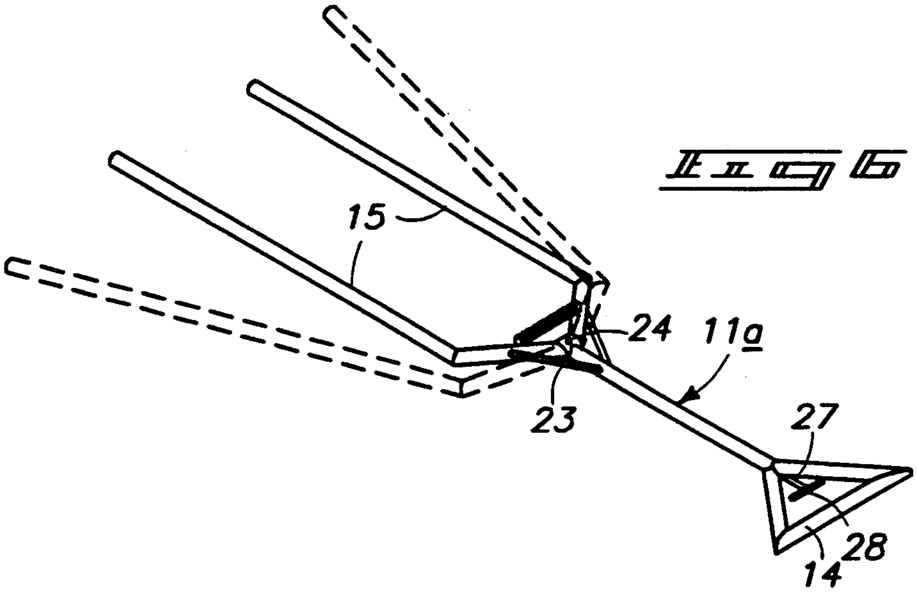
FIG. 6 is an isometric illustration of a modified carrier member.
Figure 7:
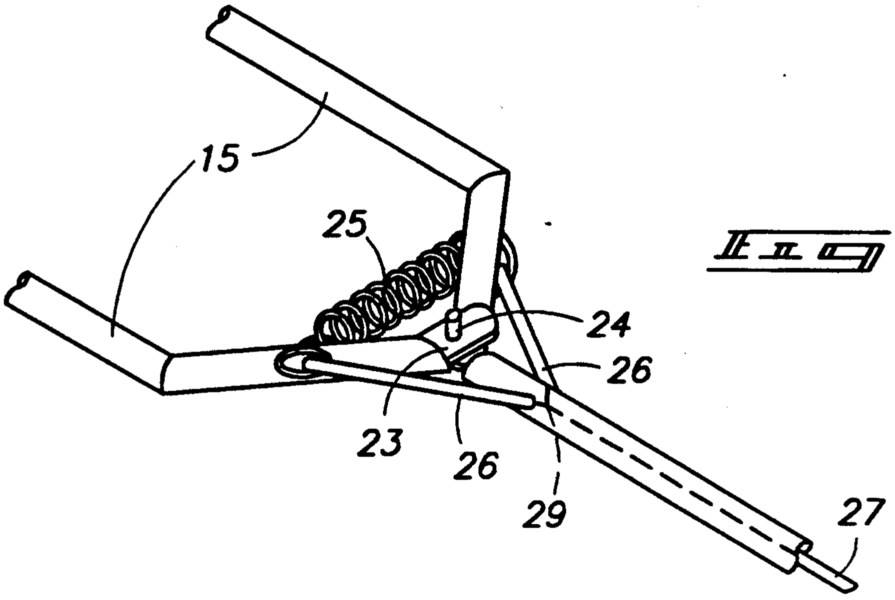
FIG. 7 is an enlarged isometric illustration of the carrier member support legs.

FIGS. 6 and 7 illustrate the use of a modified carrier member 11*a*, wherein the right and left support legs 15 and 16 are pivotally mounted at their rear terminal ends to a support leg pivot junction 23 about a pivot axle 24 that is orthogonally oriented relative to an axis of the central support bar 13. The central support bar 13 is also formed of a tubular configuration to receive reciprocatingly an actuator rod 27 therethrough. A forward distal end of the actuator rod 27 is mounted to an actuator cable junction 29, wherein a respective right and left actuator cable 26 are joined, wherein the right and left actuator cable 26 are directed through associated openings within the central support bar 13 and respectively mounted to the respective right and left support legs 15. The support legs 15 are biased in a first parallel relationship, as illustrated in FIG. 7, by a return spring 25 mounted between the support legs 15 forwardly of the junction 23. The actuator rod 27 extends rearwardly through the central support bar 13 and emerges therefrom and is positioned within the handle 14 to include an actuator rod handle 28, whereupon the withdrawal of the actuator rod 27 relative to the support bar 13 effects a spreading of the support legs 15 to accommodate logs of various sizes thereon.

Figure 8:
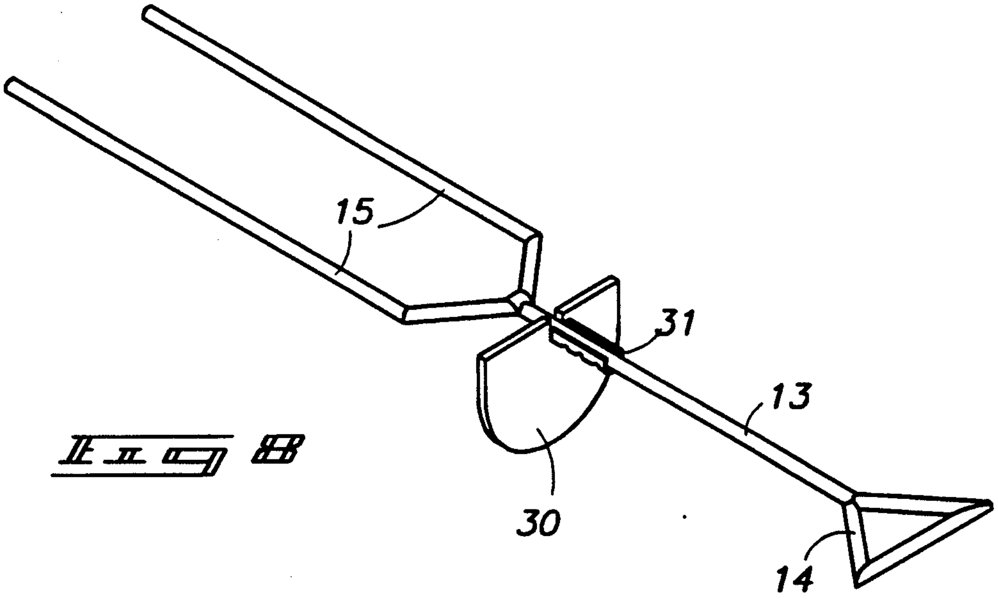
FIG. 8 is an isometric illustration of a heat shield optionally employed by the instant invention.
Figure 9:
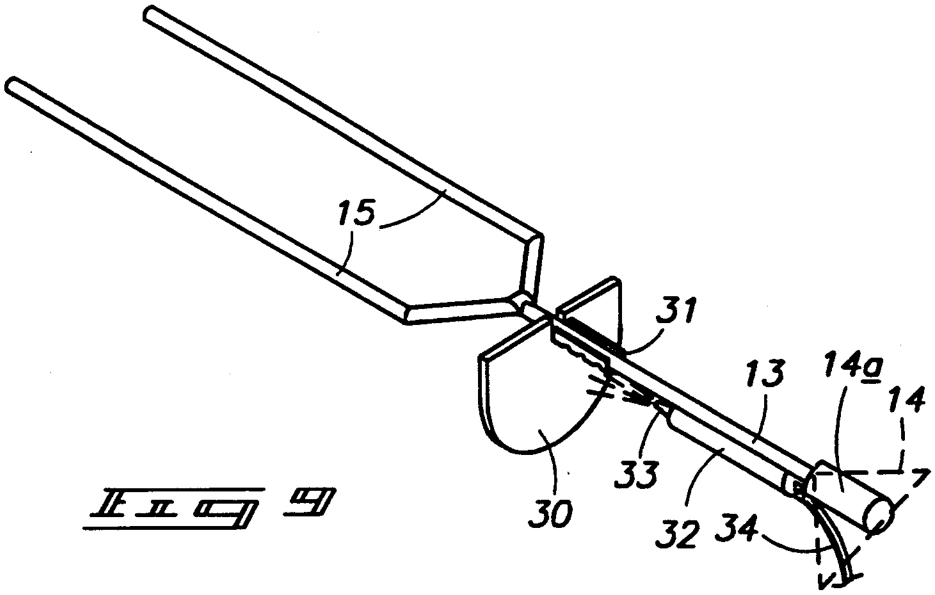
FIG. 9 is an isometric illustration of the heat shield in association with a cooling assembly.

The FIG. 8 illustrates the use of a heat shield 30 fixedly mounted to the central support bar 13 adjacent the support legs 15 that may be utilized by the embodiment of the carrier member 11 or 11*a* by the FIGS. 1 and 6 respectively. The heat shield 30 includes a fibrous grasp sleeve 31 extending rearwardly of and orthogonally oriented relative to the heat shield to accommodate manual grasping of the sleeve 31 to assist in manipulation of the organization in use. The heat shield is orthogonally oriented relative to the axis of the support member 12 as noted. The FIG. 9 illustrates a cooling assembly to provide cooling of the heat shield should such be required, and the reservoir 32 includes a nozzle 33 orthogonally oriented relative to the heat shield and in confrontation therewithin, wherein an actuator lever 34 effects projection of cooling fluid such as water onto the heat shield to effect its cooling and permit prolonged usage of the organization and manipulation of fireplace logs.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A log handling apparatus, comprising in combination, a carrier member arranged for selective association with a support member, wherein the carrier member includes a central support bar defined by a predetermined thickness, the central support bar including a carrier member handle mounted at a rear distal end of the support bar, and a right and left support leg defining a "U" shaped cradle mounted at a forward distal end of the support bar, wherein the support legs are arranged in a first parallel coextensive relationship defining a predetermined width between the support legs, and the support member includes a forward "U" shaped bracket spaced from a rear "U" shaped bracket, the forward "U" shaped bracket defined by a first length at least equal to the predetermined width, and the rear "U" shaped bracket is defined by a second length less than the first length, wherein the second length is substantially equal to the predetermined thickness, and at least one forward support leg mounted to the forward "U" shaped bracket extending therebelow, and at least one rear support leg mounted to the rear "U" shaped bracket extending therebelow, wherein the forward and rear support legs are mounted to at least one mounting bar, wherein the mounting bar is arranged for positioning of the support member upon an underlying support surface.

2. An apparatus as set forth in claim 1 wherein the support legs are pivotally joined to the central support bar at a pivot junction, and the support bar defined along a support bar axis, and an axle directed through the pivot junction pivotally mounting the support legs, wherein the axle is oriented orthogonally relative to the axis.

3. An apparatus as set forth in claim 2 including a return spring. wherein the return spring is mounted to each of the support legs to bias the support legs in the first position when the return spring is positioned forwardly of the pivot junction.

4. An apparatus as set forth in claim 3 wherein respective support legs defined by a respective right and left support leg each include a respective right and left actuator cable secured to the respective right and left support leg, wherein the right and left actuator cables are directed into the central support bar and secured at an actuator cable junction within the support bar, and an actuator rod mounted to the actuator cable junction extending from the actuator junction through the support bar and projecting rearwardly of the support bar within the carrier member handle, and an actuator rod handle mounted to the actuator rod within the carrier member handle.

5. An apparatus as set forth in claim 4 wherein a heat shield is fixedly mounted to the support bar adjacent the pivot junction orthogonally oriented relative to the axis, wherein the heat shield extends laterally relative to the axis.

6. An apparatus as set forth in claim 5 including a reservoir mounted to the support bar rearwardly of the heat shield, with the reservoir including a nozzle, the nozzle positioned in confronting relationship relative to the heat shield, and an actuator lever operatively coupled to the reservoir to effect fluid flow from the reservoir through the nozzle onto the heat shield upon actuation of the actuator lever.

* * * * *